US012811380B2

(12) United States Patent
Primm et al.

(10) Patent No.: US 12,811,380 B2
(45) Date of Patent: Nov. 24, 2026

(54) MIRROR WITH INTEGRATED WIRE MANAGEMENT ASSEMBLY

(71) Applicant: Progress Lighting, LLC, Greenville, SC (US)

(72) Inventors: Palmer Joseph Primm, Greenville, SC (US); John Linkoln Dixon, Greer, SC (US); Robert Todd Roy, Greenville, SC (US); Sean Crawford Veit, Davidson, NC (US)

(73) Assignee: Progress Lighting, LLC, Greenville, SC (US)

( * ) Notice: Subject to any disclaimer, the term of this patent is extended or adjusted under 35 U.S.C. 154(b) by 0 days.

(21) Appl. No.: 19/034,068

(22) Filed: Jan. 22, 2025

(65) Prior Publication Data

US 2025/0239843 A1 Jul. 24, 2025

Related U.S. Application Data

(60) Provisional application No. 63/624,342, filed on Jan. 24, 2024.

(51) Int. Cl.
*H02G 3/10* (2006.01)
*F21V 23/00* (2015.01)
(Continued)

(52) U.S. Cl.
CPC ........... *H02G 3/105* (2013.01); *F21V 23/001* (2013.01); *F21V 23/0485* (2013.01);
(Continued)

(58) Field of Classification Search
CPC ...... H02G 3/105; H02G 3/0437; H05B 45/20; F21V 23/001; F21V 23/0485;
(Continued)

(56) References Cited

U.S. PATENT DOCUMENTS 2,834,872 A * 5/1958 Esley ...................... F21V 33/00 362/140
9,170,353 B2 * 10/2015 Chang ...................... G02B 5/08
(Continued)

FOREIGN PATENT DOCUMENTS

CA 467111 A 8/1950
CN 202408047 U 9/2012
(Continued)

OTHER PUBLICATIONS

International Search Report and Written Opinion for Application No. PCT/US2025/012559, dated Apr. 15, 2025, 13 pages.

*Primary Examiner* — Bao Q Truong
(74) *Attorney, Agent, or Firm* — Brooks Kushman P.C.

(57) ABSTRACT

A mirror assembly that includes a mirror having one or more box openings, a frame shaped to correspond to the shape of the mirror, a wire management assembly and a power supply assembly. The wire management assembly has one or more electrical boxes that are secured to the frame and positioned adjacent to the one or more corresponding box openings in the mirror. The wire management assembly also has at least one raceway that extends between the one or more electrical boxes and the frame. The wire management assembly provides electrical wires between the power supply assembly and one or more electrical fixtures attached to the one or more electrical boxes so that the one or more electrical fixtures are on a face side of the mirror. The power supply assembly provides electrical power to the one or more electrical fixtures.

19 Claims, 9 Drawing Sheets

(51) Int. Cl.

| | |
|---|---|
| ***F21V 23/04*** | (2006.01) |
| ***F21V 33/00*** | (2006.01) |
| ***H02G 3/04*** | (2006.01) |
| ***H05B 45/20*** | (2020.01) |
| *A47G 1/00* | (2006.01) |
| *A47G 1/16* | (2006.01) |
| *F21Y 115/10* | (2016.01) |

(52) U.S. Cl.
CPC ......... *F21V 33/004* (2013.01); *H02G 3/0437* (2013.01); *H05B 45/20* (2020.01); *A47G 1/00* (2013.01); *A47G 2001/1673* (2013.01); *F21Y 2115/10* (2016.08)

(58) Field of Classification Search
CPC ..... F21V 33/004; F21Y 2115/10; A47G 1/00; A47G 2001/1673
See application file for complete search history.

(56) References Cited

U.S. PATENT DOCUMENTS

| | | | | |
|---|---|---|---|---|
| 11,927,337 | B1 * | 3/2024 | Tang | F21S 4/24 |
| 2008/0212218 | A1 * | 9/2008 | Mischel | G09F 9/00<br>359/871 |
| 2024/0019115 | A1 | 1/2024 | Xu | |

FOREIGN PATENT DOCUMENTS

| | | | |
|---|---|---|---|
| CN | 204889401 | U | 12/2015 |
| CN | 107307693 | A | 11/2017 |
| KR | 20180126725 | A | 11/2018 |
| KR | 102287386 | B1 | 8/2021 |
| PL | 64825 | Y1 | 3/2010 |

* cited by examiner

Fig. 6A
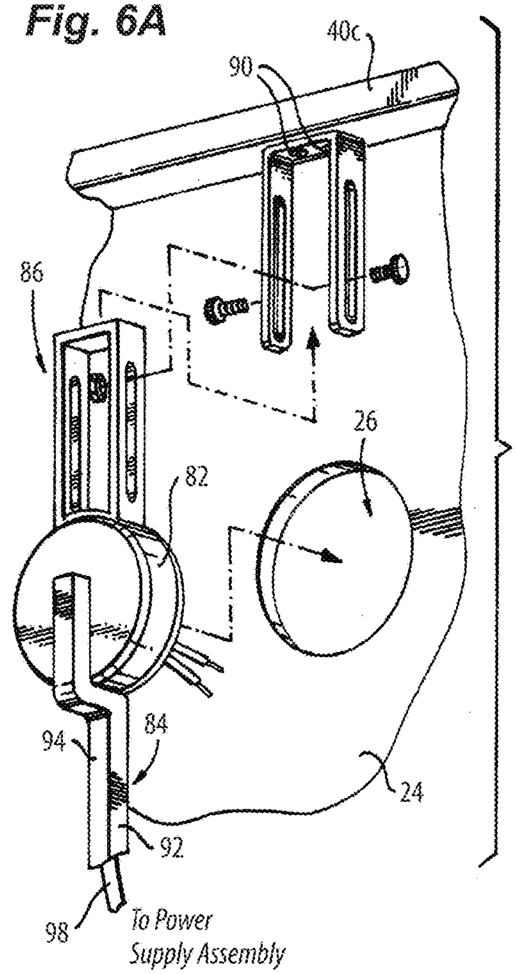
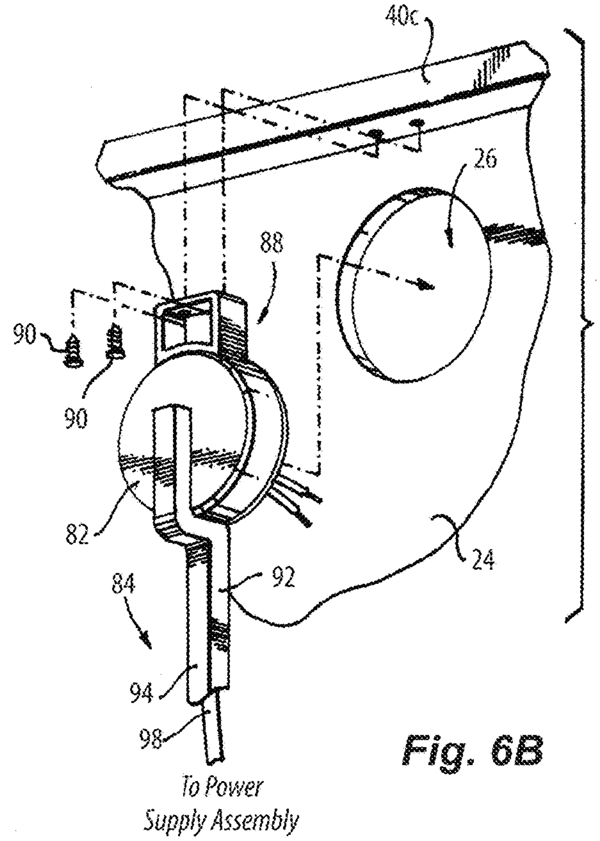
Fig. 6B
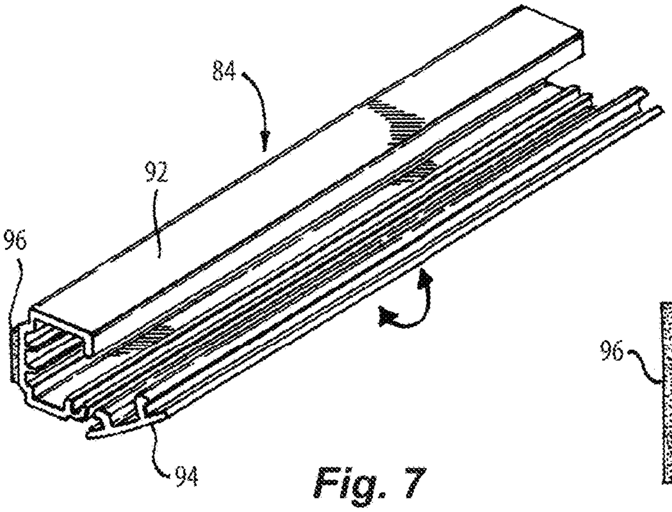
Fig. 7
Fig. 7A
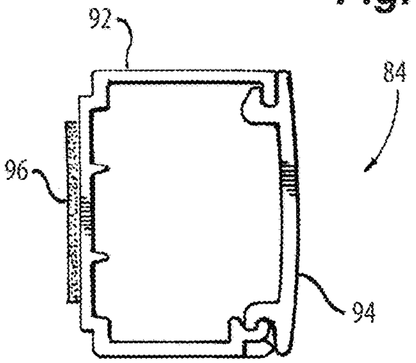

Fig. 18
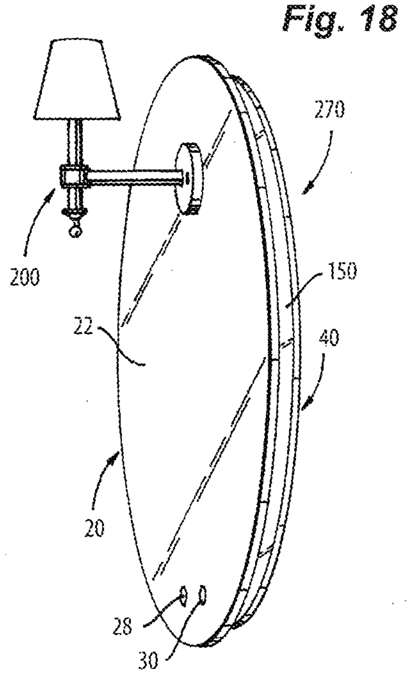
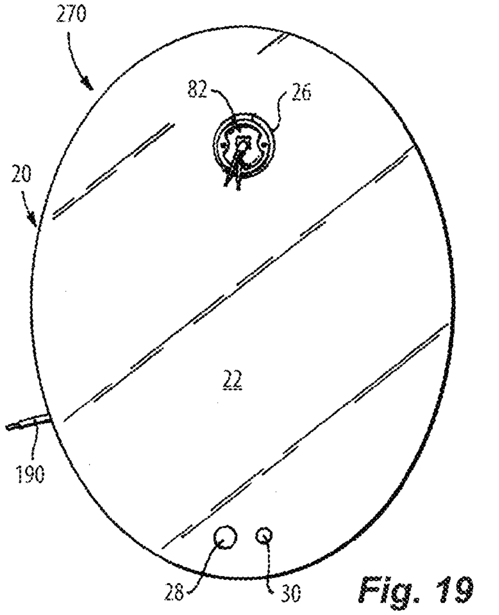
Fig. 19
Fig. 20
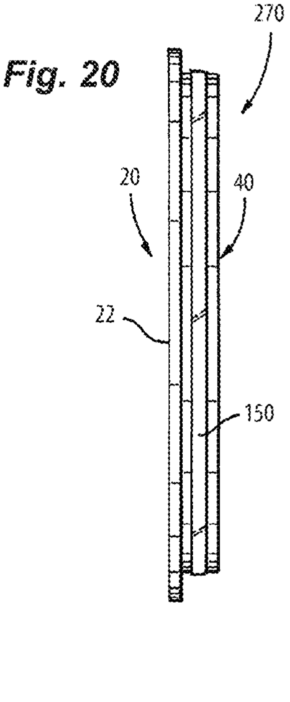
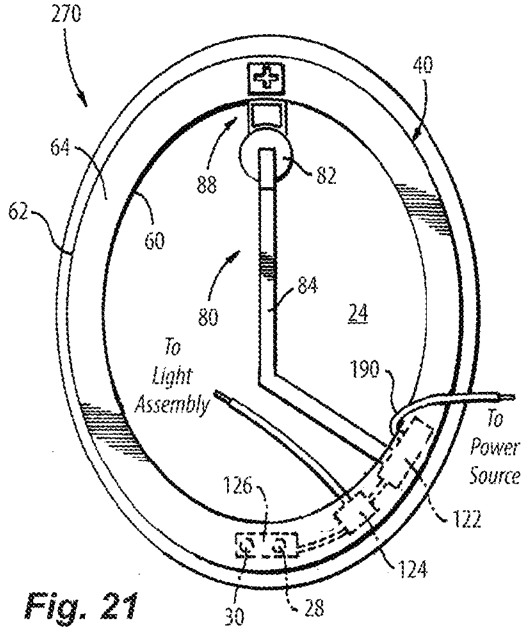
Fig. 21

MIRROR WITH INTEGRATED WIRE MANAGEMENT ASSEMBLY

CROSS REFERENCE TO RELATED APPLICATIONS

This application claims priority to U.S. Application Ser. No. 63/624,342 filed on Jan. 24, 2024, which is incorporated herein by reference in its entirety.

TECHNICAL FIELD

The present disclosure relates generally to mirror assemblies, and more specifically to mirror assemblies that include a mirror and an integrated wire management assembly for mounting electrical fixtures and/or electrical devices directly to the mirror and supplying electrical power to the electrical fixtures and/or electrical devices.

DESCRIPTION OF THE RELATED ART

Mirrors are generally used in enclosed rooms in residential and commercial buildings, such that a localized source of lighting, other than the overhead lighting within the enclosed room, may be needed to adequately illuminate the room. In some instances, either out of necessity or for aesthetics, the mirror may have a cutout for an electrical fixture, such as a light fixture, or an electrical wiring device, such as a receptacle. Typically, the electrical box holding the electrical wires that supply power to the electrical fixture and/or the electrical wiring device, is recessed within the wall to which the mirror is mounted. The wiring for the electrical fixture and/or the electrical wiring device is then attached to the supply wiring within the electrical box. Once the electrical fixture and/or the electrical wiring device are connected to the supply wiring, the electrical fixture and/or the electrical wiring device can then be attached to the electrical box from the front face of the mirror so that the electrical fixture and/or the electrical wiring device is accessible from the face of the mirror.

However, there may be instances where electrical wiring for an electrical fixture and/or the electrical wiring device is not available at the desired location where the mirror is to be mounted to the wall, such that the electrical fixture and/or the electrical wiring device may not be properly orientated on the mirror. The present disclosure provides exemplary implementations of mirror assemblies that include a mirror and an integrated wire management assembly for mounting electrical fixtures and/or electrical devices directly to the mirror and supplying electrical power to the electrical fixtures and/or electrical devices.

SUMMARY OF THE INVENTION

The present disclosure provides implementations of mirror assemblies. In an exemplary implementation, the mirror assembly includes a mirror, a frame, a wire management assembly and a power supply assembly. The mirror has a face, a reflective layer on the rear surface of the mirror and at least one opening, e.g. an electrical box opening. The reflective layer can be partitioned to have at least one touch area in a predefined location of the reflective layer. The touch area is defined by at least a portion of the reflective layer being removed from the rear surface of the mirror in a predefined shape, e.g., a circular shape. The frame has a shape that corresponds to the shape of the mirror and is configured to be attached to a structure, such as a wall in a residential or commercial building. The frame is attached to the rear surface of the mirror. The power supply assembly is positioned at least partially within the frame and includes a wire termination member. The power supply assembly can include a touch controller, e.g., a capacitive touch controller, that can be adhered to the rear surface of the mirror so that the touch controller is positioned proximate the at least one touch area. The touch controller is responsive to user touch of the touch area. For example, the touch controller can include at least one touch pad that is responsive to user touch. The wire management assembly can be attached at least partially to the rear surface of the mirror and the frame. The wire management assembly includes at least one electrical box and at least one raceway. The at least one electrical box can be a non-metallic electrical box or a metallic electrical box. The at least one electrical box is positioned adjacent to the at least one opening in the mirror and preferably secured to the frame. The at least one raceway extends between the at least one electrical box and the frame. The at least one raceway is provided to enclose electrical wires running between the electrical box and the power supply assembly. The at least one raceway can be a non-metallic raceway or a metallic raceway. The mirror assembly can also include a light assembly positioned around the perimeter of the frame. The light assembly is operatively connected to the power supply assembly. In an exemplary implementation, the light assembly can be an LED strip. In another exemplary implementation, the mirror assembly includes a mirror, a frame, a power supply assembly and a wire management assembly. The mirror has a face, a reflective layer on the rear surface of the mirror and at least one opening. The reflective layer is partitioned to have at least one touch area in a predefined location of the reflective layer. The touch area is defined by at least a portion of the reflective layer being removed from the rear surface of the mirror in a predefined shape, e.g., a circular shape. The frame is attached to the rear surface of the mirror. The frame has a shape that corresponds to the shape of the mirror and is configured to be attached to a structure, such as a wall of a residential or commercial building. The power supply assembly is positioned at least partially within the frame. The power supply assembly includes a wire termination member and a touch controller adhered to the rear surface of the mirror so that the touch controller is positioned proximate the at least one touch area. The touch controller being responsive to user touch of the touch area. For example, the touch controller can include at least one touch pad that is responsive to user touch. The wire management assembly can be attached at least partially to the rear surface of the mirror and the frame. The wire management assembly includes at least one electrical box and at least one raceway. The at least one electrical box can be a non-metallic electrical box or a metallic electrical box. The at least one electrical box is positioned adjacent to the at least one opening in the mirror and preferably secured to the frame. The at least one raceway extends between the at least one electrical box and the frame. The at least one raceway is provided to enclose electrical wires running between the electrical box and the power supply assembly. The at least one raceway can be a non-metallic raceway or a metallic raceway. The mirror assembly can also include a light assembly positioned around the perimeter of the frame. The light assembly is operatively connected to the power supply assembly. In an exemplary implementation, the light assembly can be an LED strip.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 6A is a local perspective view of the mirror assembly of FIG. 6, illustrating the electrical box of the wire management assembly staged for attachment to the frame via an adjustable mounting bracket;

FIG. 6B is another local perspective view of the mirror assembly of FIG. 6, illustrating the electrical box of the wire management assembly staged for attachment to the frame via a fixed mounting bracket;

FIG. 7 is a perspective view of an exemplary implementation of a raceway of the wire management assembly;

FIG. 7A is an end elevation view of the raceway of FIG. 7;

FIG. 18 is a front perspective view of another exemplary implementation of a mirror assembly according to the present disclosure, illustrating an oval mirror and frame, and illustrating another exemplary implementation of an electrical fixture attached to the face of the oval mirror;

FIG. 19 is a front elevation view of the mirror assembly of FIG. 18 with the electrical fixture removed revealing an opening in the oval mirror and an electrical box of the wire management assembly within the opening;

FIG. 20 is a side elevation view of the mirror assembly of FIG. 18, illustrating the oval mirror, frame and a light assembly around a perimeter of the frame; and FIG. 21 is a rear elevation view of the mirror assembly of FIG. 18, illustrating another exemplary implementation of the wire management assembly and the power supply assembly according to the present disclosure.

DETAILED DESCRIPTION

Figure 1:
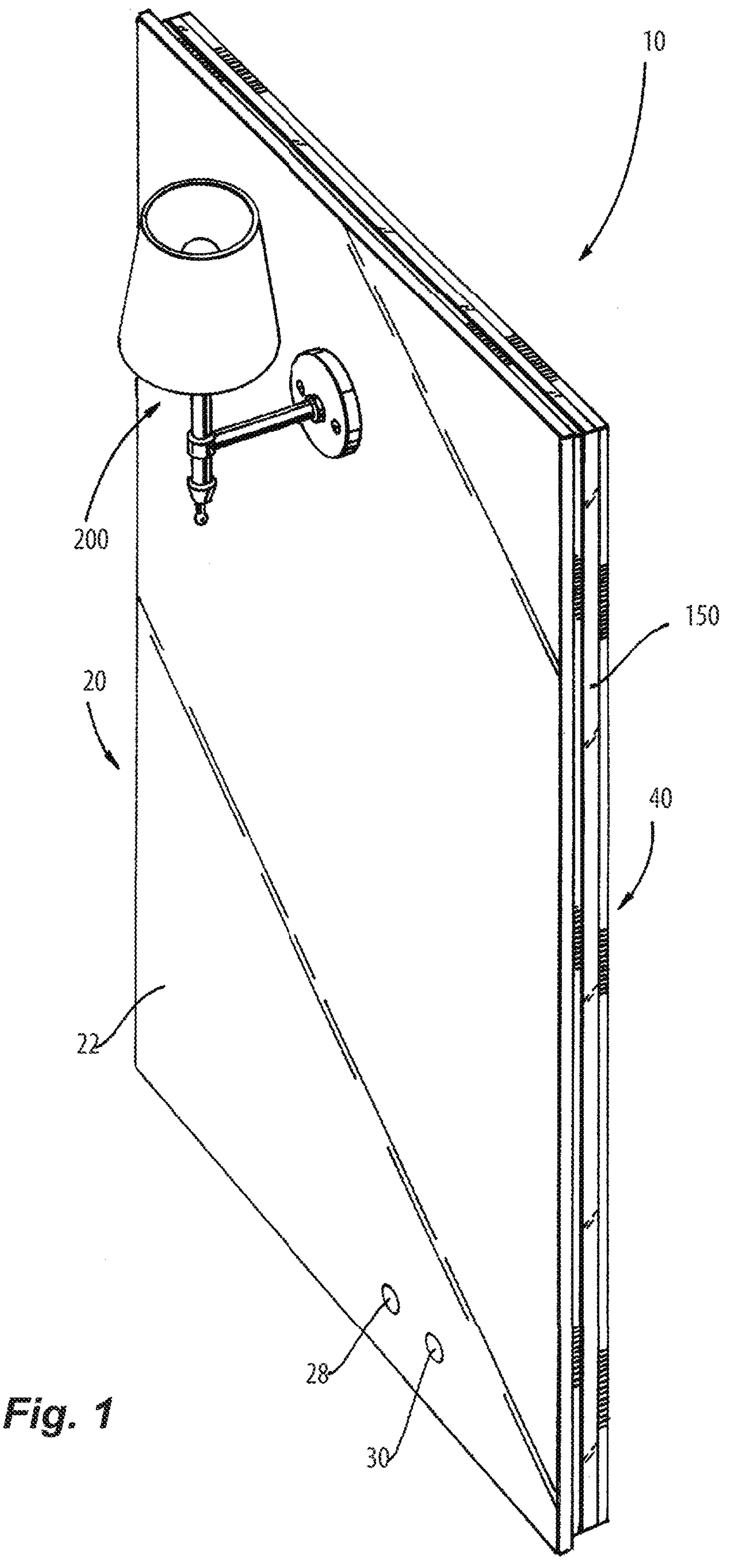
FIG. 1 is a front perspective view of an exemplary implementation of a mirror assembly according to the present disclosure, illustrating a mirror and frame of the mirror assembly, and illustrating an exemplary implementation of an electrical fixture attached to the fac of the mirror.

The present disclosure provides implementations of mirror assemblies that include a mirror, a frame, a power supply assembly and a wire management assembly that can be attached to the frame or integral with the frame or monolithically formed into the frame. The wire management assembly can include one or more electrical boxes used for mounting electrical fixtures and/or electrical devices directly to the mirror and one or more raceways used to enclose electrical wires forming a portion of the wire management assembly.

Referring now to FIGS. 1-6, an exemplary implementation of a mirror assembly 10 according to the present disclosure is shown. The mirror assembly 10 includes mirror 20, frame 40, wire management assembly 80 and power supply assembly 120. The mirror 20 in this implementation is a vertically orientated rectangular shaped mirror. However, the mirror 20 can be in any shape, including the horizontally orientated rectangular shaped mirrors shown in FIGS. 10-17, the oval shaped mirror shown in FIGS. 18-21, a round mirror (not shown) and a square mirror (not shown). The mirror 20 can be made of, for example, glass or a plastic material, and has conventional mirror properties that include a face 22, seen in FIG. 2, and a reflective layer on a rear surface 24, seen in FIG. 6, of the mirror 20. The reflective layer is typically made of a highly polished metal, such as silver and aluminum, to reflect light.

Figure 3:
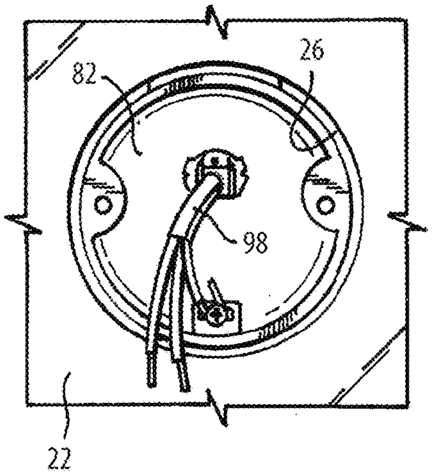
FIG. 3 is an enlarged view of a portion of the mirror assembly of FIG. 2 taken from detail 3, illustrating the electrical box within the opening and electrical wires within the electrical box.

As shown in FIGS. 3, 6A and 6B, the mirror 20 includes one or more box openings 26 positioned on the mirror 20 in desired locations to mount one or more electrical fixtures 200, seen in FIG. 1, and/or to mount one or more electrical wiring devices (not shown). It is noted that the electrical fixtures 200 contemplated by the present disclosure include lighting fixtures, such as wall mounted lighting fixtures including sconces. Further, the electrical wiring devices contemplated by the present disclosure include receptacles and switches. Each opening 26 in the mirror 20 is configured to provide access to an open interior of an electrical box 82 of the wire management assembly 80 from the face 22 of the mirror 20, which is described in more detail below. Each opening 26 in the mirror 20 is also configured to permit an electrical fixture 200 or an electrical wiring device (not shown) to be secured to the electrical box 82 from the face 22 side of the mirror 20. As an example, if the box opening 26 is for an electrical fixture 200, the electrical box 82 can be a round box, such as a 3 inch round box or a 4 inch round box. However, the electrical box 82 can be an octagon box, a rectangular box or a square box. A non-limiting example of a non-metallic box is the PolyTrak Series, PolyTrak Box, Round PDB12LF round raceway box sold by Hubbell Incorporated, Shelton, CT, which is incorporated herein in its entirety by reference. In instances where spacing is a concern, the one or more electrical boxes 82 can be narrow depth electrical boxes having a depth in a range from about ½ inch to about 1.5 inches. It is noted that round boxes with a ½ depth can also be referred to as pancake boxes. It is also noted that rectangular boxes with a depth of 1.5 inches can also be referred to as handy boxes.

Figure 5:
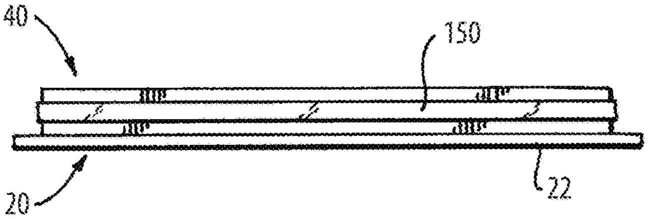
FIG. 5 is atop plan view of the mirror assembly of FIG. 2, illustrating the mirror and frame of the mirror assembly and the light assembly around the perimeter of the frame.
Figure 6:
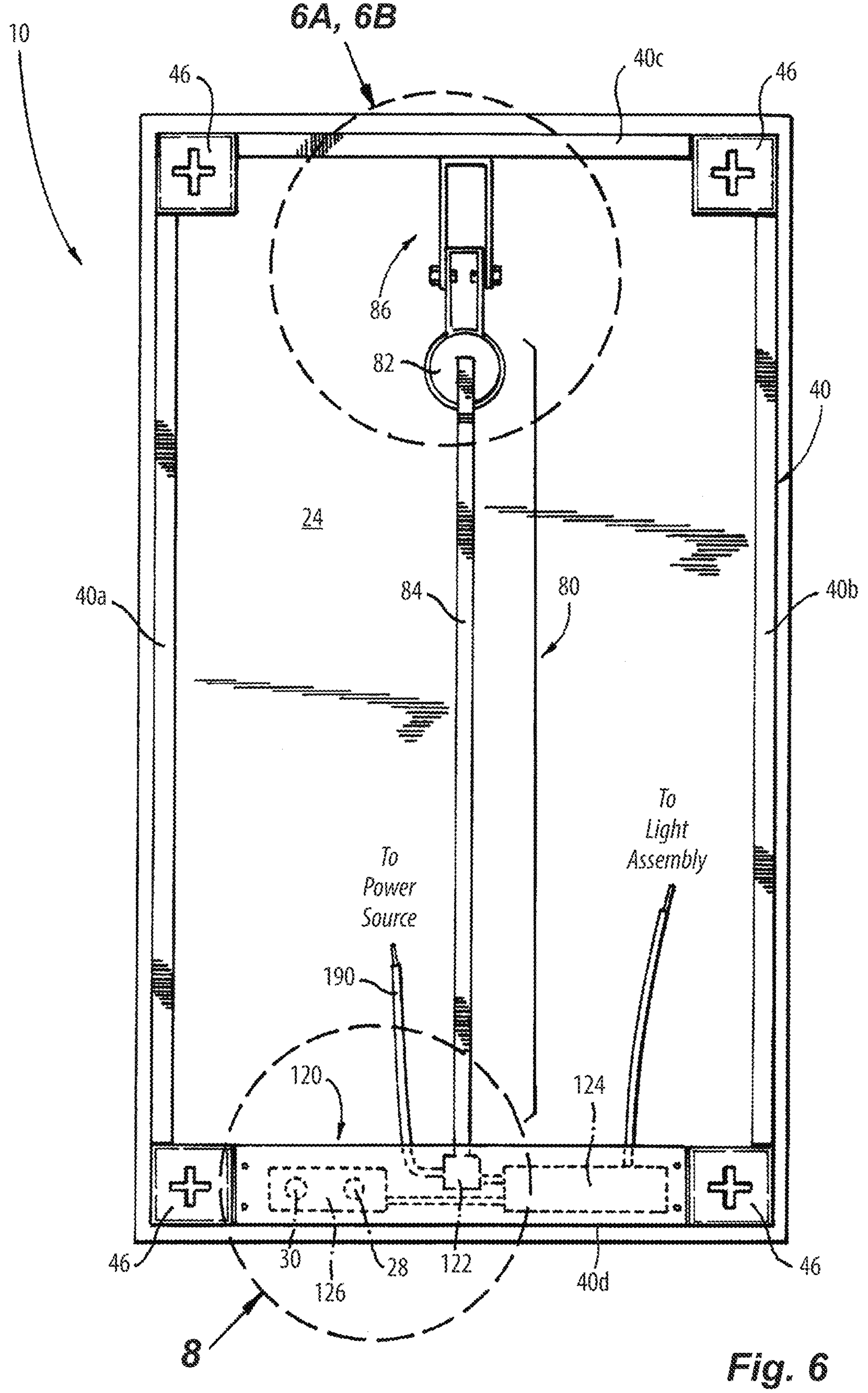
FIG. 6 is a rear elevation view of the mirror assembly of FIG. 1, illustrating an exemplary implementation of the wire management assembly and a power supply assembly according to the present disclosure.

Referring to FIGS. 1 and 6, the frame 40 is configured and dimensioned to support the mirror 20 and to conform to the shape of the mirror 20. Preferably, the peripheral dimensions of the frame 40 are the same size as or smaller in size than the peripheral dimensions of the mirror 20. To illustrate, in the implementation of FIGS. 1-6 the frame 40 is configured and dimensioned to support a vertically oriented rectangular mirror 20 and the frame 40 is smaller in size than the peripheral dimensions of the mirror 20. In the implementations of FIGS. 10-17, the frame 40 is configured and dimensioned to support a horizontally oriented rectangular mirror 20 and the frame 40 is smaller in size than the peripheral dimensions of the mirror 20. Further, in the implementation of FIGS. 18-21, the frame 70 is configured and dimensioned to support an oval mirror 20 and is smaller in size than the peripheral dimensions of the mirror 20.

Figure 8:
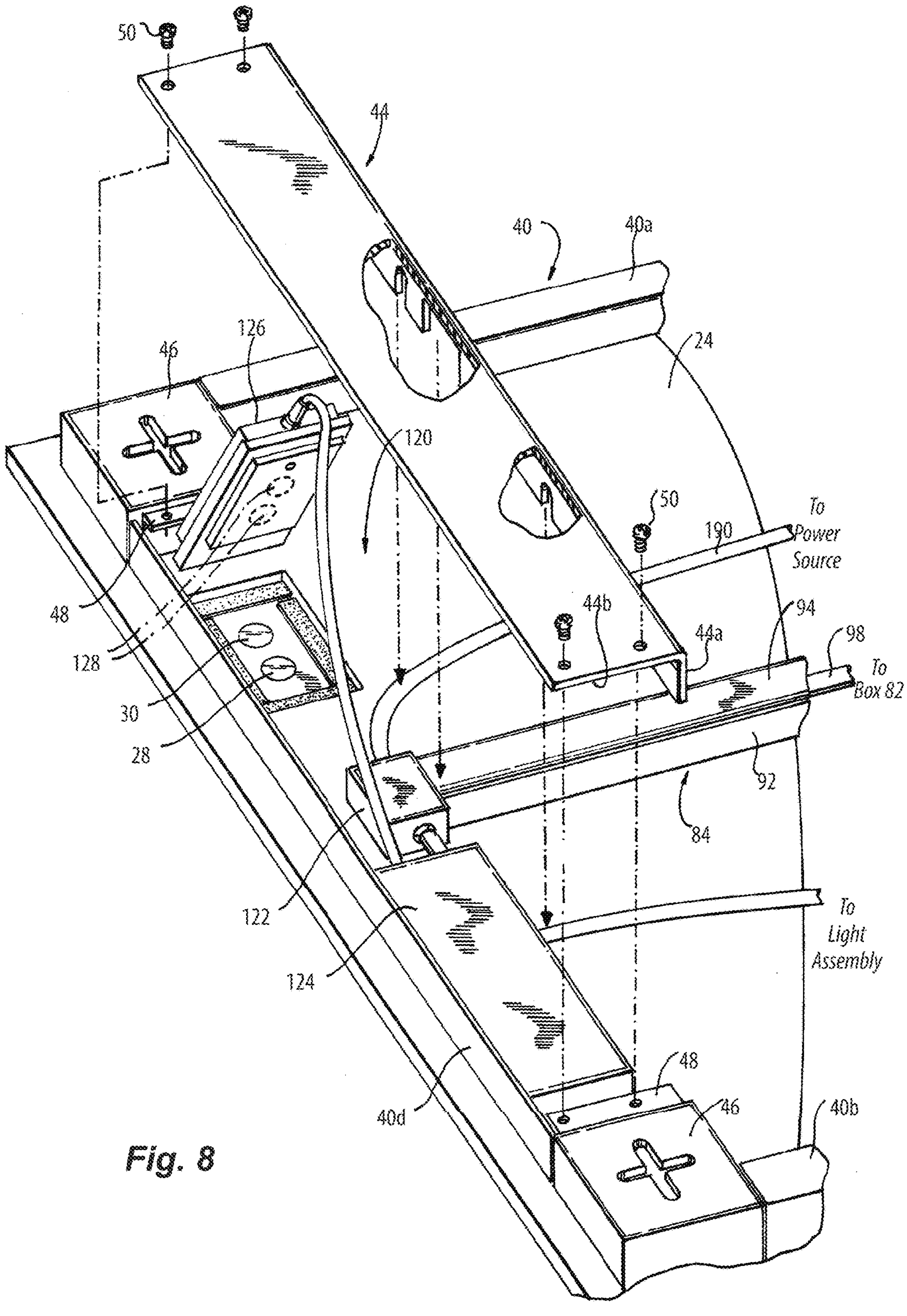
FIG. 8 is an enlarge view of a portion of a rear side of the mirror of FIG. 6, illustrating a cover removed from the frame revealing an exemplary implementation of the power supply assembly according to the present disclosure.

In the exemplary implementation shown in FIGS. 6 and 8, the frame 40 includes a side wall **40*a*, a side wall 40*b*, a top wall 40*c* and a bottom wall 40*d*. The walls 40*a*-40*d* are secured together to form a rectangular frame with an open interior portion. Each corner of the frame 40 can include a wall mounting bracket 46 as shown. The side walls 40*a* and 40*b* and the top wall 40*c* can be solid walls or hollow walls. The bottom wall 40*d* can be formed as a rectangular trough 42 having a removable cover 44. In this exemplary implementation, the cover 44 is an L-shaped cover, where wall 44*a* of the cover 44 forms a side of the bottom wall 40*d*, and wall 44*b* of the cover 44 forms a top of the bottom wall 40*d*. The cover 44 is secured to brackets 48 of the bottom wall 40*d* using, for example, mechanical fasteners 50** such as machine screws.

Referring to FIGS. 6-7A, the wire management assembly 80 according to the present disclosure includes one or more electrical boxes 82, one or more conduits or raceways 84 and one or more electrical wires 98. The one or more conduits or raceways 84 are secured between the electrical boxes 82 and the bottom wall **40*d* of the frame 40 housing the power supply assembly 120. In the exemplary implementation of FIGS. 6 and 6A, there is one electrical box 82 that is a round pancake box. However, as noted above, the electrical box 82 can be an octagon box, a rectangular box or a square box. The electrical box 82 is secured to the frame 40. In the implementation shown in FIGS. 6 and 6A, the electrical box 82 is secured to the top wall 40*c* of the frame 40 using a mounting bracket 86. In the exemplary implementation shown in FIG. 6A, the mounting bracket 86 is an adjustable mounting bracket that permits length of the mounting bracket to be adjusted so that the electrical box 82 can extend from the top wall 40*c* a sufficient distance to fit within the opening 26 in the mirror 20. In the implementation shown, the adjustable mounting bracket 86 is a two-piece bracket with a first bracket portion attached to or monolithically formed into the electrical box 82, and a second bracket portion that is then secured to the top wall 40*c* of the frame 40 using fasteners 90, such as sheet metal screws. The second bracket portion is movably attached to the first bracket portion using, for example, mechanical fasteners such as a nut and bolt. In another exemplary implementation shown in FIG. 6B, the mounting bracket 88 is a fixed mounting bracket that is attached to or monolithically formed into the electrical box 82. The mounting bracket 88 is then secured to the top wall 40*c* of the frame 40 using fasteners 90, such as sheet metal screws. The fixed mounting bracket 88 has a predefined length so that the electrical box 82 extends from the top wall 40*c* a sufficient distance to fit within the opening 26 in the mirror 20** as shown.

It is noted that the frame 40 can also include a seal member (not shown) between the frame and the rear surface 24 of the mirror 20. The seal member can be provided to limit and possibly prevent moisture from entering a power supply assembly within the bottom wall **40*d* of the frame 40**.

In the exemplary implementation shown in FIGS. 6, 6A, 7, 7A and 8, the wire management assembly 80 includes one raceway 84 secured between electrical box 82 and the bottom wall **40*d* of the frame 40. The raceway 84 can be a non-metallic raceway or a metallic raceway. In an exemplary implementation, the raceway 84 is a split non-metallic raceway having a base 92 and a removable cover 94 that can be secured to the base 92 with, for example, a snap-fit connection. The base 92 can include an adhesive strip 96 on a bottom surface, as shown in FIG. 7A. The adhesive strip 96 permits the raceway 84 to be secured to the rear surface 24 of the mirror 20, as shown in FIG. 6. The base 92 is configured and dimensioned to hold one or more electrical wires 98 between the power supply assembly 120 located in the bottom wall 40*d* of the frame 40 and the electrical box 82. In the exemplary implementation shown in FIGS. 7 and 7A, the base 92 is a U-shaped trough configured and dimensioned so that the one or more electrical wires 98 can be placed in the base 92 and the cover 94 encloses the one or more electrical wires 98 within the raceway 84 when the cover 94 is attached or latched to the base 92**. Non-limiting examples of non-metallic raceways include the PL1 Latching LANTRAK Base and Cover raceway and the PP1 PremiseTrak (Latching) Base and Cover raceway, sold by Hubbell Incorporated, Shelton, CT, which are incorporated herein in their entirety by reference.

Figure 4:
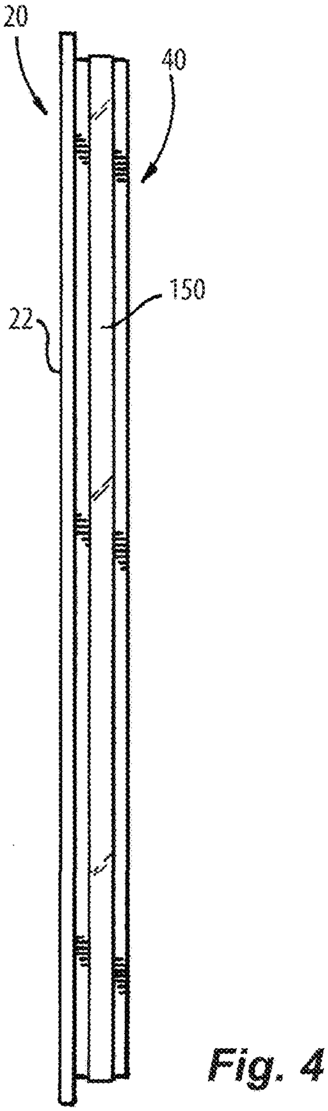
FIG. 4 is a side elevation view of the mirror assembly of FIG. 2, illustrating the mirror and frame of the mirror assembly and a light assembly around a perimeter of the frame.

Referring now to FIGS. 1, 6, 8 and 9, an exemplary implementation of the power supply assembly 120 according to the present disclosure is shown. It is noted that the mirror assembly 10 according to the present disclosure can be a mirror assembly with a built-in light assembly or the mirror assembly 10 can be a mirror assembly without a built-in light assembly. In the implementation shown in FIGS. 1-9, the mirror assembly 10 is a mirror assembly with a built-in light assembly. Thus, in this exemplary implementation, the mirror assembly includes the mirror 20, the frame 40, the wire management assembly 80, the power supply assembly 120 and a light assembly 150. The light assembly 150 is positioned around a perimeter of the frame 40 as shown in FIGS. 1, 4 and 5. More specifically, the light assembly 150 is secured to an exterior surface of the side wall 40*a*, the side wall 40*b*, the top wall 40*c* and the bottom wall 40*d*, and is electrically connected to the power supply assembly 120 as described in more detail below. In the exemplary implementation shown, the light assembly 150 is a strip of light emitting diodes (LEDs) 158, which is also known as an LED strip. However, the present disclosure contemplates other known light assemblies.

Figure 2:
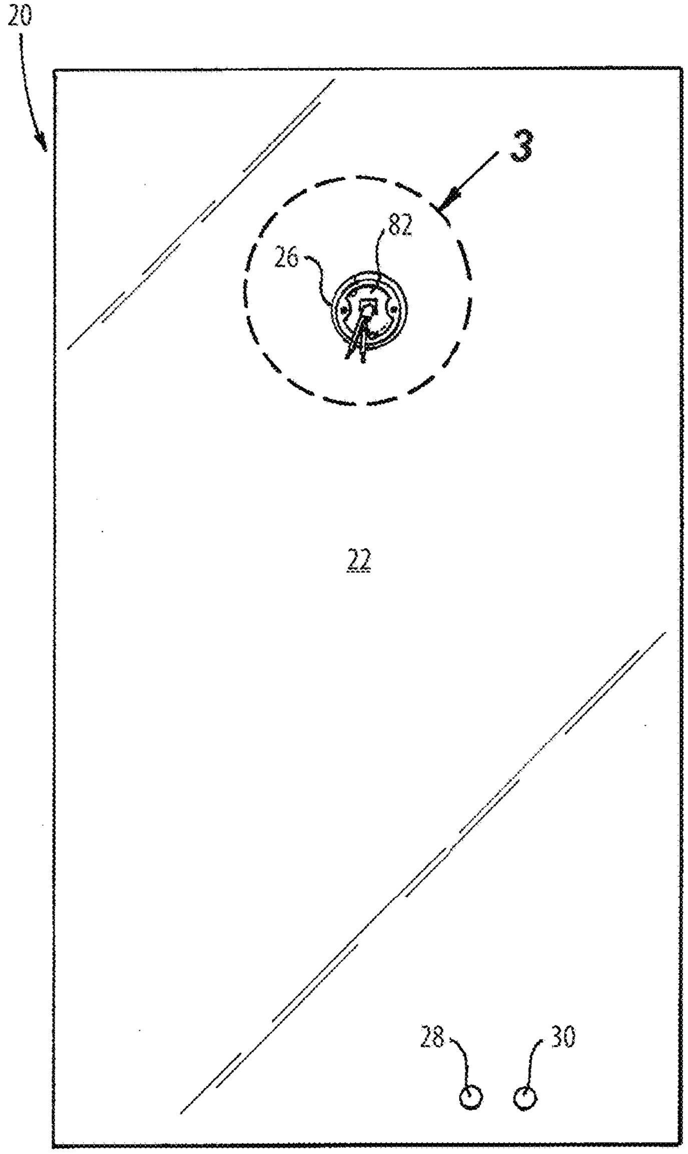
FIG. 2 is a front elevation view of the mirror assembly of FIG. 1 with the electrical fixture removed revealing an opening in the mirror and an electrical box of a wire management assembly within the opening.

In the exemplary implementation where the mirror assembly 10 includes alight assembly 150, the reflective layer on the rear surface 24 of the mirror 20 can be partitioned into one or more touch areas used to control the light assembly 150 as described below. In instances where the light assembly 150 is an LED strip, controlling the light assembly 150 includes, for example, turning the LEDs 158 "on" and "off" and changing the color temperature levels, e.g., 3000 K, 4000 K and 5000 K, of the LEDs 158, which is also known as the CCT level. In the implementation shown, there are two touch areas 28 and 30. In the exemplary implementations according to the present disclosure, the one or more touch areas 28 and 30 are openings or holes formed in the reflective layer on the rear surface 24, seen in FIG. 8, such that no reflective material is on the rear surface 24 of the mirror 20. Thus, the touch areas 28 and 30 are electrically isolated from the reflective layer. The opening or hole formed in the reflective layer defining each touch area 28 or 30 can be visible on the face 22 of the mirror 20, as shown in FIGS. 1 and 2. The dimensions of the opening or hole defining each touch area 28 or 30 should be sufficient so that ambient electromagnetic noise on the reflective layer on the rear surface 24 of the mirror 20 does not interfere with the operation of a touch controller 126 adhered to the rear side of the mirror 20, as described below. In the implementations shown in FIGS. 1 and 8, the openings or holes defining the touch areas 28 and 30 are circular openings. The openings or holes defining each touch area 28 and 30 can have the same diameter, or the holes defining each touch area 28 and 30 can have different diameters. For the circular openings or holes defining each touch area 28 and 30, the minimum diameter of the openings or holes can be about 14 mm and the maximum diameter of the openings or holes can be about 22 mm so that ambient electromagnetic noise on the reflective layer on the rear surface 24 of the mirror 20 does not interfere with the operation of a touch controller 126. However, the present disclosure contemplates that the openings or holes defining the touch areas 28 and 30 can have different shapes and sizes.

Figure 9:
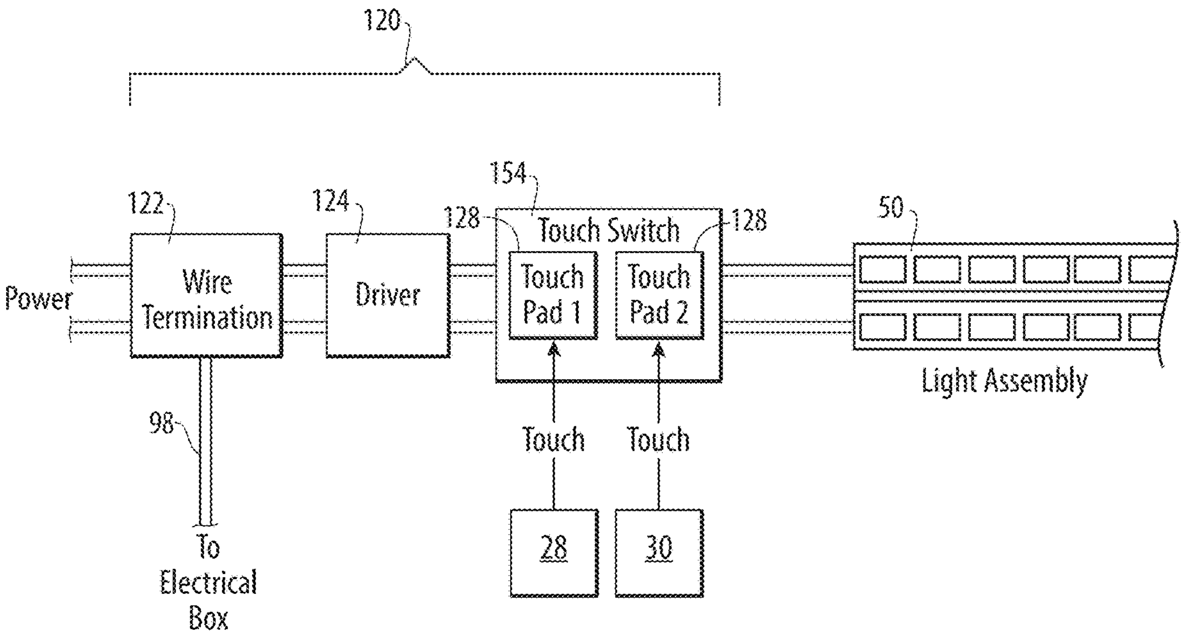
FIG. 9 is an exemplary block diagram of control circuit for lighting the perimeter light assembly of the mirror assembly and for supplying power to the electrical box of the wire management assembly.
Figure 10:
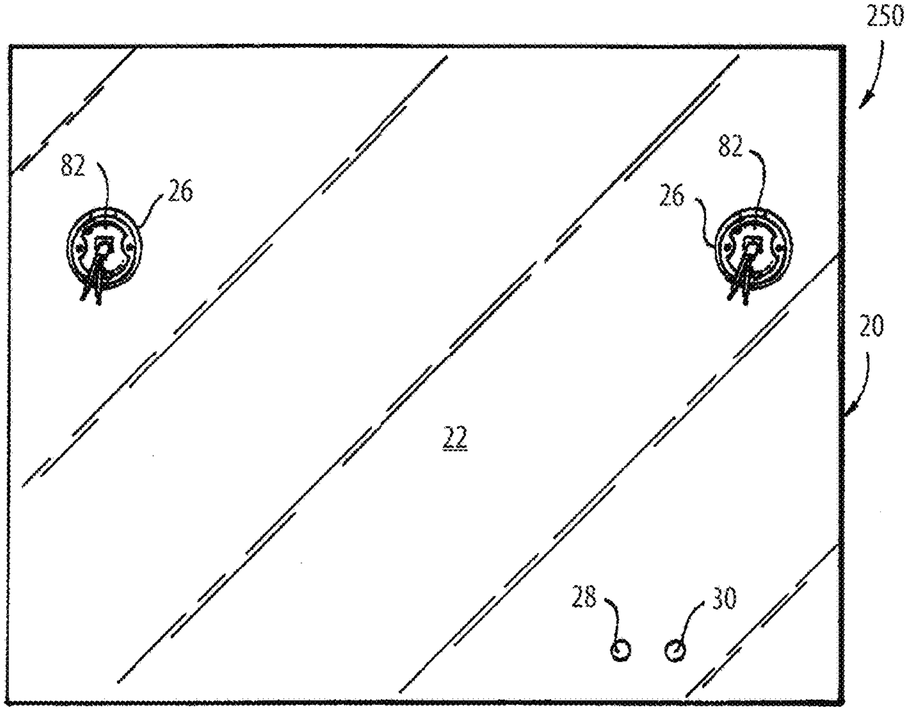
FIG. 10 is a front elevation view of another exemplary implementation of a mirror assembly according to the present disclosure, illustrating a mirror with the electrical fixtures removed revealing two openings in the mirror and an electrical box of the wire management assembly within each opening.
Figure 11:
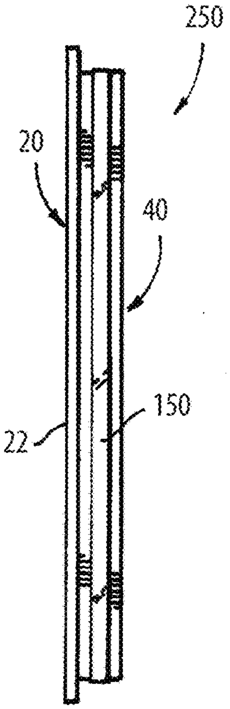
FIG. 11 is a side elevation view of the mirror assembly of FIG. 10, illustrating the mirror orientated horizontally, a frame and a light assembly around a perimeter of the frame.
Figure 12:
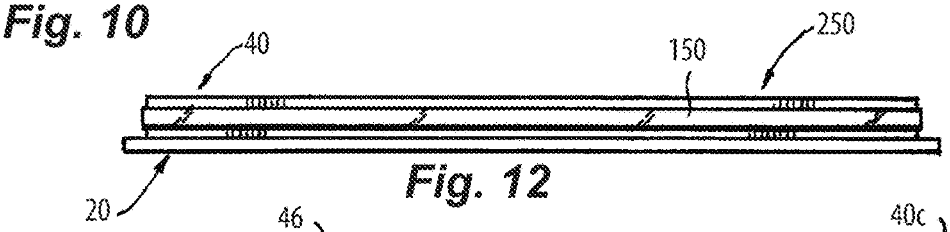
FIG. 12 is a top plan view of the mirror assembly of FIG. 10, illustrating the mirror, frame and the light assembly around the perimeter of the frame.
Figure 13:
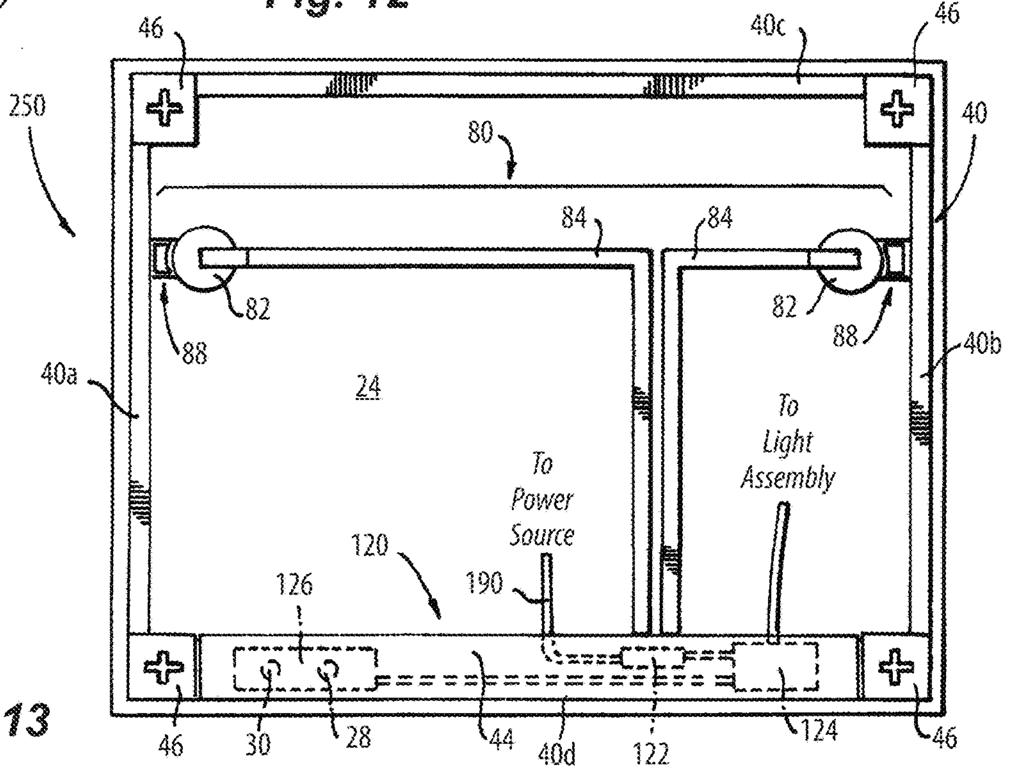
FIG. 13 is a rear elevation view of the mirror assembly of FIG. 10, illustrating another exemplary implementation of the wire management assembly and power supply assembly.
Figure 14:
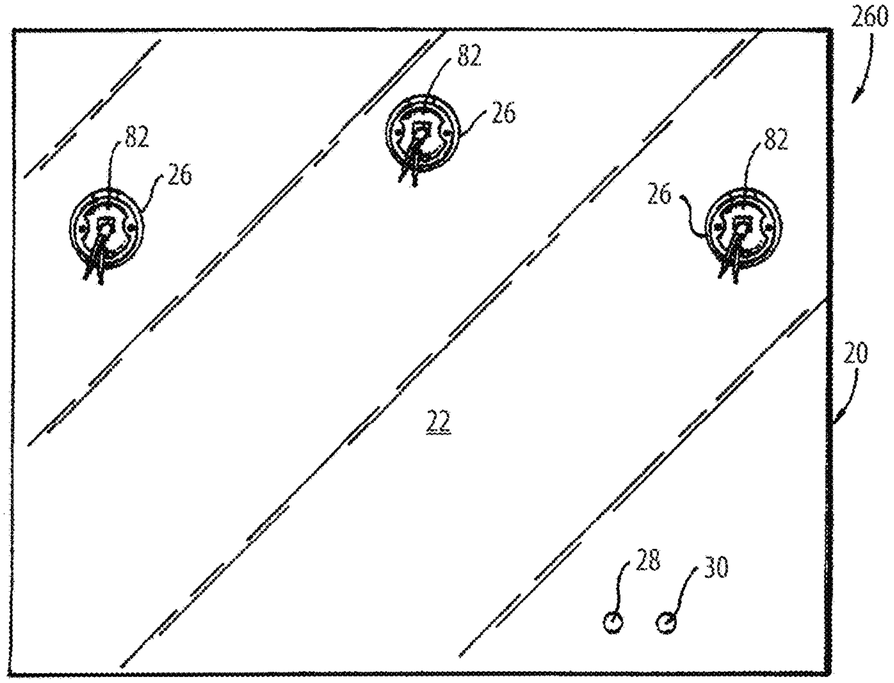
FIG. 14 is a front elevation view of another exemplary implementation of a mirror assembly according to the present disclosure, illustrating a mirror with the electrical fixtures removed revealing three openings in the mirror and an electrical box of the wire management assembly within each opening.
Figure 15:
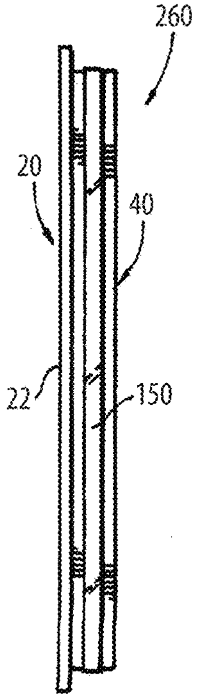
FIG. 15 is a side elevation view of the mirror assembly of FIG. 14, illustrating the mirror, a frame and a light assembly around a perimeter of the frame.
Figure 16:
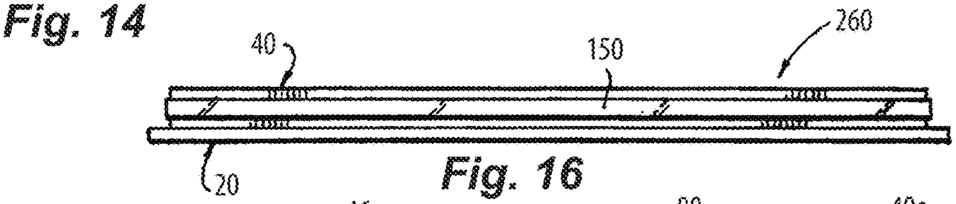
FIG. 16 is a top plan view of the mirror assembly of FIG. 14, illustrating the mirror, frame and the light assembly around the perimeter of the frame.
Figure 17:
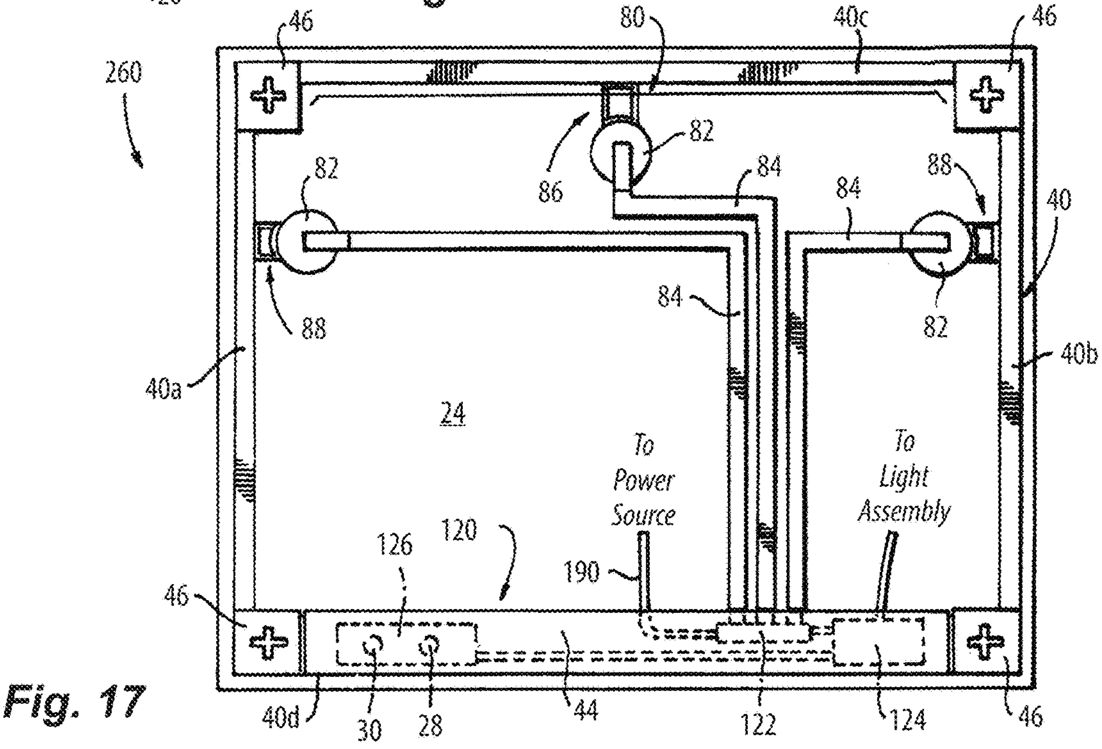
FIG. 17 is a rear elevation view of the mirror assembly of FIG. 14, illustrating another exemplary implementation of the wire management assembly and the power supply assembly.

As shown in the block diagram of FIGS. 8 and 9, in the exemplary implementation where the mirror assembly 10 includes the light assembly 150, the power supply assembly 120 includes one or more wire termination members or boxes 122, a driver 124 and a touch controller 126. For ease of description, the wire termination members or boxes 122 can also be referred to herein as the "termination member" in the singular and the "termination members" in the plural. In an exemplary implementation, the one or more termination members 122 are provided as connection components where AC power, e.g., 120 VAC, from cable 190 to the mirror assembly 10 can be connected to the power supply assembly 120, and where AC power from cable 190 can be connected to the one or more electrical wires 98 within the raceway 84 to provide AC power to the one or more electrical fixtures 200. In the exemplary implementation where the mirror assembly 10 includes the light assembly 150, the one or more termination members 122 can also be used to connect the power supply assembly 120 to the light assembly 150. The driver 124 converts 120 VAC to a voltage suitable for the light assembly 150. In the implementation where the light assembly 150 is an LED strip, the driver 124 can be an LED driver, such as the XLG-150-12-A LED driver, manufactured by Mean Well USA, Inc. of Fremont, California, which is incorporated herein in its entirety by reference. In the exemplary implementation shown herein, the touch controller 126 is a capacitive touch controller. The capacitive touch controller 126 can have one or more built-in touch pads 128, seen in FIG. 8, that are adjacent to or proximate the exterior surface of the capacitive touch controller 126. The capacitive touch controller 126 is positioned against the rear surface 24 of the mirror 20, as shown in FIG. 8, so that the touch pads 128 of the capacitive touch controller 126 are located proximate the touch areas 28 and 30 of the mirror 20. The capacitive touch controller 126 is adhered to the rear side 24 of the mirror 20 using, for example, adhesives or adhesive strips. A non-limiting example of a suitable capacitive touch controller 126 is the model Royoho M7025, manufactured by Shenzhen Royoho Technology Co., Ltd, Shenzhen, China, http://www.royoho.com, which is incorporated herein in its entirety by reference.

In an exemplary implementation, when a user touches touch area 28 of the mirror 20, the corresponding touch pad 128 of the capacitive touch controller 126 associated with the touch area 28 outputs a signal that is used by the capacitive touch controller 126 to control the light assembly 150 as follows:

Light Control

- One short press of touch area 28 causes light assembly 150 to turn "on".
- A second short press of touch area 28 causes light assembly 150 to turn "off".
- Pressing and holding the touch area 28 causes the light assembly 150 to slowly cycle from a dimming up cycle through a dimming down cycle until the user releases her or his finger from the touch area 28.

In an exemplary implementation, when a user touches touch area 30 of the mirror 20, the respective touch pad 128 of the capacitive touch controller 126 associated with the touch area 30 outputs a signal that is used by the capacitive touch controller 126 to control the color temperature of the light assembly 150 as follows:

CCT Control

- One short press of the touch area 30 causes the light assembly 150 to cycle through a preset interval of two or more different color temperature levels. For example, the preset interval may be set to three, and the two or more different color temperature levels may be three color temperature levels 3000 K, 4000 K and 5000 K. In this example, one short press of the touch area 30 would cause the light assembly 150 to cycle through three intervals of three-color temperature levels as follows: 3000 K, 4000 K, 5000 K; 3000 K, 4000 K, 5000 K; and 3000 K, 4000 K, 5000 K.
- Pressing and holding the touch area 30 causes the light assembly 150 to cycle continuously through all CCT values between a minimum CCT value and a maximum CCT value. Releasing the touch area 30 stops the continuous cycling of CCT values at the CCT value when the touch area is released.

Referring now to FIGS. 10-13, another exemplary implementation of a mirror assembly 250 according to the present disclosure is shown. The mirror assembly 250 includes the mirror 20, the frame 40, the wire management assembly 80, the power supply assembly 120 and the light assembly 150 described above. Thus, the mirror 250 is substantially the same as the mirror assembly 10 described above, except that the mirror 20 includes two box openings 26 and the wire management assembly 80 includes two electrical boxes 82 and two raceways 84. It is noted that the two raceways 84 can be combined into a single raceway 84 with the use of raceway fittings including, for example, Tee raceway fittings and Elbow raceway fittings. A non-limiting example of a non-metallic Tee raceway fitting is the PP1TC PremiseTrak (Latching) Tee raceway fitting, sold by Hubbell Incorporated, Shelton, CT, which is incorporated herein in its entirety by reference. A non-limiting example of a non-metallic Elbow raceway fitting is the PP1IE PremiseTrak (Latching) Internal Elbow raceway fitting, sold by Hubbell Incorporated, Shelton, CT, which is incorporated herein in its entirety by reference.

Referring now to FIGS. 14-17, another exemplary implementation of a mirror assembly 260 according to the present disclosure is shown. The mirror assembly 260 includes the mirror 20, the frame 40, the wire management assembly 80, the power supply assembly 120 and the light assembly 150 described above. Thus, the mirror assembly 260 is substantially the same as the mirror assembly 10 described above, except that the mirror 20 includes three box openings 26 and the wire management assembly 80 includes three electrical boxes 82 and three raceways 84. It is noted that the three raceways 84 can be combined into a single raceway 84 with the use of raceway fittings including, for example, Tee raceway fittings and Elbow raceway fittings. A non-limiting example of a non-metallic Tee raceway fitting is the PP1TC PremiseTrak (Latching) Tee raceway fitting, sold by Hubbell Incorporated, Shelton, CT, which is incorporated herein in its entirety by reference. A non-limiting example of a non-metallic Elbow raceway fitting is the PP1IE PremiseTrak (Latching) Internal Elbow raceway fitting, sold by Hubbell Incorporated, Shelton, CT, which is incorporated herein in its entirety by reference.

Referring now to FIGS. 18-21, another exemplary implementation of a mirror assembly 270 according to the present disclosure is shown. The mirror assembly 270 includes the mirror 20, the frame 40, the wire management assembly 80, the power supply assembly 120 and the light assembly 150 described above. Thus, the mirror assembly 270 is substantially the same as the mirror assembly 10 described above so that a detailed description of mirror 20, the wire management assembly 80, the power supply assembly 120 and the light assembly 150 are not repeated. However, in this exemplary implementation, the shape of the mirror 20 is oval instead of rectangular, and the frame 40 is configured and dimensioned to support an oval mirror, such that the peripheral dimensions of the frame 40 are the same size or smaller in size as the peripheral dimensions of the oval mirror 20. In this exemplary implementation, the frame 40 can be configured and dimensioned to include an oval trough having an inner wall 60 and an outer wall 62 that is spaced from the inner wall 60. A rear wall 64 extends between the inner wall 60 and the outer wall 62 forming a channel of the trough. The rear wall 64 also covers the central portion of frame 40 such that the rear of the frame 40 is fully covered. In this exemplary implementation, the inner wall 60, outer wall 62 and the rear wall 64 can be an integrally or monolithically formed so that the frame 40 is an integrally or monolithically formed structure. However, the inner wall 60, outer wall 62 and the rear wall 64 can be separate wall segments, e.g., side wall segments and end wall segments, joined together by, for example, welds, adhesives and/or mechanical fasteners. The channel defined by the inner wall 60, outer wall 62 and the rear wall 64 can have a uniform width around the perimeter of the frame 40, or the width or the channel can vary around the perimeter of the frame 40. The frame 40 can include the seal member (not shown) that is positioned between the mirror 20 and the frame 40 so that when the mirror 20 is attached to the frame 40, a seal is formed between the rear surface 24 of the mirror 20 and the channel of the frame 40 that limits and possibly prevents environmental conditions, e.g., moisture or liquids, from entering the channel of the frame 40. IN this exemplary implementation, the power supply assembly 120 is at least partially within the trough of the frame 40.

It is noted that for a given capacitive touch controller 126, as the distance between the one or more built-in touch pads 128 and the corresponding one or more touch areas 28 and 30 increases, by for example mirrors with larger thicknesses, the size of the one or more touch pads 128 and/or the one or more touch areas 28 and 30 can be increased so that the capacitive touch controller 126 can detect the user's touch of the touch area 28 and/or the touch area 30. In another implementation, increasing the sensitivity of the touch controller 126 can also permit the capacitive touch controller 126 to detect the user's touch of the touch area 28 and/or 30.

As noted herein, the multiple touch areas 28 and 30 are intended to permit generation of separate control signals for the light assembly 150. For example, in the exemplary implementations described herein, the touch area 28 can be for controlling the operation of the light assembly 150, and the touch area 30 can be for controlling the color temperature level of the light assembly 150. Thus, it can be desirable to minimize crosstalk between the built-in touch pads 128 of the capacitive touch controller 126. The spacing between the touch pads 128 and thus the openings in the reflective layer defining the touch areas 28 and 30 can provide capacitive isolation between the touch areas 28 and 30 and thus limit crosstalk between the touch pads 128. As the distance between the tough pads 128 and thus the touch areas 28 and 30 increases, the capacitive crosstalk between touch pads 128 decreases. Further, increasing the spacing between the touch areas 28 and 30 can isolate the capacitive touch controller 126 from ambient electromagnetic noise that is picked up by the reflective layer 24 of the mirror.

Touch controllers 126 can be configured to perform various functions. In various implementations, the touch controllers 126 can include a processor that receives inputs from the built-in touch pads 128 and executes predefined functions in response thereto. A user touches one of the touch areas 28 and 30 to create a change in the capacitive circuit within the touch controller 126 that is proximate the rear surface 24 of the mirror 20 over the touch areas 28 and 30. The user's touch results in a change in the capacitive circuit of the touch pad 128 within the touch controller 126 which is measured by the processor. The processor then controls the operation of the light assembly 150 as described above, including, for example, turning the light assembly 150 "on" or "off", adjusting the intensity of the light emitted by the light assembly 150, and adjusting the color temperature of the light emitted by the light assembly 150.

As shown throughout the drawings, like reference numerals designate like or corresponding parts. While exemplary implementations of the present disclosure have been described herein and shown in the accompanying drawings, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

Certain terminology can be used in the present disclosure for ease of description and understanding. Examples include the following terminology or variations thereof: up, upward, upper, top, inner, outer, down, downward, bottom, lower, etc. These terms refer to directions in the drawings to which reference is being made and not necessarily to any actual configuration of the structure or structures in use and, as such, are not necessarily meant to be limiting.

What is claimed is:

1. A mirror assembly comprising:

a mirror having a face, a reflective layer on a rear surface thereof and at least one opening, wherein the mirror is configured to be operably connectable to a power supply;

a frame having a shape that corresponds to a shape of the mirror and configured to be attached to a structure, wherein the rear surface of the mirror is attached to the frame; and a wire management assembly attached at least partially to the rear surface of the mirror, wherein the wire management assembly comprises at least one electrical box and at least one raceway, wherein the at least one electrical box is positioned adjacent the at least one opening in the mirror and secured to the frame, and wherein the at least one raceway extends between the at least one electrical box and the frame.

2. The mirror assembly according to claim 1, wherein the at least one electrical box comprises a non-metallic electrical box.

3. The mirror assembly according to claim 1, wherein the at least one raceway comprises a non-metallic raceway.

4. The mirror assembly according to claim 1, wherein the reflective layer is partitioned to have at least one touch area in a predefined location of the reflective layer, the touch area being defined by the reflective layer being removed from the rear surface of the mirror in a predefined shape.

5. The mirror assembly according to claim 4, wherein the predefined shape is a circular shape.

6. The mirror assembly according to claim 1, further comprising a light assembly positioned around a perimeter of the frame and operatively connected to the power supply assembly.

7. The mirror assembly according to claim 6, wherein the light assembly comprises an LED strip.

8. A mirror assembly comprising:

a mirror having a face, a reflective layer on a rear surface thereof and at least one opening, the reflective layer being partitioned to have at least one touch area in a predefined location of the reflective layer, the touch area being defined by the reflective layer being removed from the rear surface of the mirror in a predefined shape, wherein the mirror is configured to be operably connectable to a power supply;

a frame having a shape that corresponds to a shape of the mirror and configured to be attached to a structure, wherein the rear surface of the mirror is attached to the frame; and a wire management assembly having at least one electrical box and at least one raceway, wherein the at least one electrical box is positioned adjacent the at least one opening in the mirror and secured to the frame, and wherein the at least one raceway extends between the at least one electrical box and the frame.

9. The mirror assembly according to claim 8, further comprising a light assembly positioned around a perimeter of the frame and operatively connected to the touch controller.

10. The mirror assembly according to claim 9, wherein the light assembly comprises an LED strip.

11. The mirror assembly according to claim 8, wherein the predefined shape is a circular shape.

12. The mirror assembly according to claim 8, wherein the at least one electrical box comprises a non-metallic electrical box.

13. The mirror assembly according to claim 8, wherein the at least one raceway comprises a non-metallic raceway.

14. A mirror assembly comprising:

a mirror having a face, a reflective layer on a rear surface thereof and at least one opening, the reflective layer being partitioned to have at least one touch area in a predefined location of the reflective layer, the touch area being defined by the reflective layer being removed from the rear side of the mirror in a predefined shape, wherein the mirror is configured to be operably connectable to a power supply;

a frame having a shape that corresponds to a shape of the mirror and configured to be attached to a structure, wherein the rear surface of the mirror is attached to the frame;

a wire management assembly having at least one electrical box and at least one raceway, wherein the at least one electrical box is positioned adjacent the at least one opening in the mirror and secured to the frame, and wherein the at least one raceway extends between the at least one electrical box and the frame; and a light assembly positioned around a perimeter of the frame and operatively connected to a touch controller adhered to the rear surface of the mirror so that the touch controller is positioned proximate the at least one touch area, the touch controller being responsive to user touch.

15. The mirror assembly according to claim 14, wherein the light assembly comprises an LED strip.

16. The mirror assembly according to claim 14, wherein the touch controller includes at least one touch pad responsive to user touch.

17. The mirror assembly according to claim 16, wherein the at least one touch pad comprises a capacitive touch pad.

18. The mirror assembly according to claim 14, wherein the predefined shape is a circular shape.

19. The mirror assembly according to claim 14, wherein the at least one electrical box comprises a non-metallic electrical box and wherein the at least one raceway comprises a non-metallic raceway.

* * * * *